United States Patent Office 2,813,856
Patented Nov. 19, 1957

2,813,856
AZO DYESTUFFS

Willy Steinemann and Walter Wehrli, Basel, Switzerland, assignors, by mesne assignments, to Saul & Co., Newark, N. J., as nominee of Fidelity Union Trust Company, executive trustee under Sandoz Trust No Drawing. Application April 20, 1953,
Serial No. 349,966

Claims priority, application Switzerland April 25, 1952

18 Claims. (Cl. 260—174)

This application is a continuation-in-part of application Serial No. 236,266, filed July 11, 1951 (and abandoned since the filing of the present application).

The present invention relates to azo dyestuffs and to the preparation thereof.

It is a primary object of this invention to embody a valuable group of disazo and polyazo dyestuffs which dye cotton and fibers of regenerated cellulose in yellow to orange-brown shades, which dyeings, as such or in the aftercoppered state, are characterized by enhanced properties, such as purity of shade and superior fastness to light.

This object is realized according to the present invention by the group of azo dyestuffs corresponding to the formula $$\overbrace{w\text{-benzene(}y\text{)(HOOC)(}y\text{)}-X-R_1-NH-CO-C(v)=C(v)-CO-b}^{a}$$

wherein X stands for $$-NH\cdot\underset{O}{C}-\langle\text{benzene}\rangle-N=N-,\ -\underset{H}{N}-\underset{O}{C}-\underset{H}{N}-\langle\text{benzene}\rangle-N=N-$$

$-N=N-$ or $-(N=N-R_2-)_{n-1}N=N-$; each of $R_1$ and $R_2$ stands for a radical of the benzene, diphenyl, stilbene, naphthalene, pyrazolone or acetoacetylaminoaryl series; one $y$ stands for $-OH$ and the other $y$ stands for hydrogen; $w$ represents hydrogen, halogen, lower alkyl, nitro, acylamino or $-SO_3H$; one $v$ stands for hydrogen and the other $v$ for hydrogen, chlorine, bromine or methyl; $n$ is one of the integers 1 and 2; and $b$ is either identical with the moiety $a$ or mutually different from such moiety $a$ or is a radical of a non-metallizable mono-, dis- or trisazo compound of the benzene, naphthalene or pyrene series.

The aforesaid group of azo dyestuffs comprises dyestuffs which correspond to the formula $$w\text{-}\langle\text{benzene}\rangle(y)(HOOC)(y)-(N=N-R_2-)_{n-1}N=N-R_1-NH-CO-C(v)=C(v)-CO-NH-R_{11}-N=N(-R_{22}-N=N)_{n-1}-\langle\text{benzene}\rangle(w)(y')(y')(COOH)$$

wherein each of $R_1$, $R_{11}$, $R_2$ and $R_{22}$ stands for a radical of the benzene, diphenyl, stilbene, naphthalene, pyrazolone or acetoacetylaminoaryl series, one $y$ and one $y'$ each stands for OH and the other $y$ and $y'$ each stands for hydrogen, while $v$, $w$ and $n$ have the afore-indicated significances.

Another group of azo dyestuffs comprised within the dyestuffs of the present invention correspond to the formula $$w\text{-}\langle\text{benzene}\rangle(y)(HOOC)(y)-(N=N-R_2-)_{n-1}N=N-R_1-NH-CO-C(v)=C(v)-CO-NH-R_6[-N=N-R_7(-N=N-R_8)_{n-1}]_{n-1}-N=N-R_9$$

wherein each of $R_6$, $R_7$ and $R_8$ stands for a radical of the benzene or naphthalene series, $R_9$ stands for a radical of the benzene, naphthalene or pyrene series, while $R_1$, $R_2$, $y$, $w$, $v$ and $n$ have the previously-described significances.

A further object of the invention is the embodiment of an efficient method for the preparation of the afore-described azo dyestuffs. This object is realized according to the present invention by reacting one mole of a dicarboxylic acid which corresponds to the formula $$z-CO-\underset{A}{C}=CH-CO-z \qquad (I)$$

wherein A stands for hydrogen, chlorine, bromine or methyl, and $z$ stands for chlorine or bromine with:

(a) Two moles of an aminoazo compound which corresponds to the formula $$w\text{-}\langle\text{benzene}\rangle(y)(HOOC)(y)-X-R_1-NH_2$$

or with:

(b) Two moles of a mixture of two different aminoazo compounds which correspond to the formula $$w\text{-}\langle\text{benzene}\rangle(y)(HOOC)(y)-X-R_1-NH_2$$

or with:

(c) Two moles of a mixture of an aminoazo compound which corresponds to the formula $$w\text{-}\langle\text{benzene}\rangle(y)(HOOC)(y)-X-R_1-NH_2$$

and an aminoazo compound which corresponds to the formula $$H_2N-R_6[-N=N-R_7(-N=N-R_8)_{n-1}]_{n-1}-N=N-R_9$$

in which formulae $R_1$, $R_6$, $R_7$, $R_8$, $R_9$, $X$, $w$, $y$ and $n$ have the previously-recited significances.

A particularly interesting sub-group of dyestuffs within the scope of the present invention correspond to the formula $$HO_3S\text{-}\langle\text{benzene}\rangle(y)(HOOC)(y)-X'-\langle\text{benzene}\rangle(R_1')(R_2')-NH-\underset{O}{C}-\underset{R_3}{C}=CH-\underset{O}{C}-HN-\langle\text{benzene}\rangle(R_1')(R_2')-X'-\langle\text{benzene}\rangle(SO_3H)(y')(y')(COOH)$$

wherein X' stands for $$-NH\cdot\underset{O}{C}-\langle\text{benzene}\rangle-N=N-,\ -\underset{H}{N}-\underset{O}{C}-\underset{H}{N}-\langle\text{benzene}\rangle-N=N-$$

or $-N=N-$, one $y$ and one $y'$ each stands for H, and the other $y$ and the other $y'$ each stands for OH, $R_1'$ stands for H, lower alkyl or lower alkoxy, $R_2'$ stands for H, lower alkyl, lower alkoxy $$-NH-\underset{O}{C}-\text{lower alkyl}$$

or $-NH\cdot COO-$lower alkyl and $R'_3$ stands for H or methyl. Lower alkyl is for instance methyl, ethyl, propyl, butyl, etc., and lower alkoxy is for instance methoxy, ethoxy, propoxy, butoxy, etc.

The dyestuffs of this sub-group can be prepared by starting from an appropriate aminoazo dyestuff which corresponds to the formula

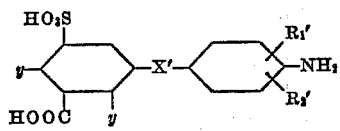

wherein $X'$, $y$, $R_1'$ and $R_2'$ have the precedingly-indicated significances, and reacting the same with a dihalide of the formula

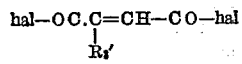

wherein $R_3'$ has the precedingly-indicated significance, and hal stands for Cl or Br, using two moles of aminoazo dyestuff per mole of dihalide.

A sub-group of the aforedescribed disazo and polyazo dyestuffs can also be prepared by diazotizing or tetrazotizing the corresponding mono- or di-amines of the formula

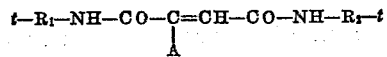

wherein A has the previously-indicated significance, one $t$ stands for the amino group and the other $t$ stands for amino, nitro or a readily saponifiable acylamino group, and each of $R_1$ and $R_2$ stands for an aryl radical, and then coupling the products with azo components which may contain substituents, including arylazo groups or diazotizable amino groups, and then if desired carrying out further coupling reactions with the so-obtained azo compounds, $t$—when it stands for nitro or a readily saponifiable acylamino group—being converted into the diazo at any stage of the preparation of the dyestuff by reduction or saponification and diazotization. The reactants are here so selected that the resultant disazo or polyazo dyestuffs contain in the molecule thereof (a) at least one end-positioned metallizable ortho-hydroxycarboxy grouping but no other metallizable grouping, (b) the requisite number of solubilizing groups to impart water-solubility thereto, and (c) at most five azo bridges.

Another embodiment of process for preparing disazo and polyazo dyestuffs encompassed by this invention involves coupling one mole of a compound of the formula

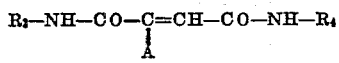

wherein A has the previously-indicated significance and each of $R_3$ and $R_4$ is the radical of an azo component, with two moles of a diazo compound or of a diazomonoazo compound which contains no other metallizable grouping than an end-positioned ortho-hydroxycarboxy grouping, or simultaneously or in any desired sequence with two moles of a mixture of two mutually different such compounds or of one such compound and one non-metallizable diazo or diazomonoazo or diazodisazo compound, with the proviso that the resultant disazo or polyazo dyestuffs contain in the molecule thereof (a) at least one end-positioned metallizable ortho-hydroxycarboxy grouping but no other metallizable grouping, (b) the requisite number of solubilizing groups to impart water-solubility thereto, and (c) at most five azo bridges.

It is also possible to combine the two last-mentioned procedures by coupling one mole of a monohydroxy compound of the formula

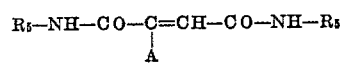

wherein A has the previously-recited significance, one $R_5$ is the radical of an azo component and the other $R_5$ is an aryl radical which contains a diazotizable amino group or a nitro group which is convertible into a diazotizable amino group or a readily saponifiable acylamino group, on the one hand with (a) one mole of a suitable diazo compound or diazoazo compound and, on the other hand—if necessary, after conversion of the nitro group or the readily saponifiable acylamino group into the diazo group—diazotizing and coupling with one mol of an appropriate azo component, which may contain any desired substituents including arylazo groups or diazotizable amino groups, it being possible to carry out additional coupling reactions before or after the aforesaid diazotization and coupling.

The joining together of the two moles of aminoazo compounds in accordance with the first hereinbefore-described process is carried out with the aid of an unsaturated dicarboxylic acid halide of Formula I, supra. Illustrative of such halides are the dichlorides and dibromides of fumaric and maleic acid, methyl-fumaric acid, methyl-maleic acid and chlorofumaric or bromofumaric acid. In order to compensate for losses due to hydrolysis, the dicarboxylic acid halides may be used in slight excess. In carrying out the process, the aminoazo compounds are dissolved in water, and the dicarboxylic acid halide (I) then added, preferably at a low temperature (about 0° to 30° C.). The reaction mixture is stirred vigorously, and liberated hydrogen halide is continuously neutralized by the addition of acid-binding agents such e. g. as sodium bicarbonate, sodium carbonate, sodium hydroxide, the corresponding lithium or potassium compounds, alkali metal acetates, alkaline earth metal oxides or carbonates, magnesium oxide, or suitable tertiary organic amines such as N,N-dimethylaminobenzene and the like. The dicarboxylic acid may, if desired, be diluted with an inert solvent, such for example as benzene, methylbenzene, chlorobenzene, carbon tetrachloride or chloroform. The condensation is ended when free NH$_2$ is no longer detectable. The reaction product is partly present in precipitated form, the remainder being precipitated from the reaction solution by salting out or, in some cases, by acidification, after which the reaction product is filtered off, washed if necessary, and dried.

A unitary dyestuff is obtained by joining together two moles of the same aminoazo compound with one mole of a dicarboxylic acid halide (I). On the other hand, when two moles of a mixture of two different aminoazo compounds are condensed with a dicarboxylic acid halide (I), a mixture of symmetrical and asymmetrical dicarboxylic acid derivatives is obtained. The mixture contains, as predominating ingredient, a component of the formula $$R—Q—T$$

wherein R stands for the radical of one aminoazo compound which is acylated in the amino group and T stands for the radical of the other such aminoazo compound, and Q stands for the radical of the dicarboxylic acid from which the dicarboxylic acid halide (I) is derived. The mixture also comprises the two symmetrical products of the formulae R—Q—R and T—Q—T The two different aminoazo compounds can be condensed together in the molar proportion 1:1 with the dicarboxylic acid halide (I). Valuable dyestuffs can also be obtained with other mixture proportions, such for example as those involved in condensation products from 1 part of dicarboxylic acid halide (I) and two aminoazo compounds in the proportion of 4:1, 3:1, 2:1, 1:2, 1:3, or 1:4; in fact, some of these possess properties which are superior to those of the dyestuffs wherein one proportion of dicarboxylic acid (I) is condensed with two proportions of two aminoazo compounds in the 1:1 proportion. Such mixtures and the preparation thereof constitute a further object of the invention.

The disazo and polyazo dyestuffs of the present invention are particularly suitable for dyeing and printing cotton and fibers of regenerated cellulose. The dyeings and prints are characterized by purity of color, good fastness to light and good fastness to wet treatments. They may be treated with metal-yielding agents, and such treatment may be carried out by a single bath process or by an after-metallization process. The treatment with metal-yielding agents in many cases imparts to the dyeings enhanced fastness to light and to wet treatments.

The dyestuff mixtures within the purview of the present invention can also be prepared by admixing the corresponding unitary dyestuffs, and in many cases the resultant mixtures are the full equivalents of those obtained during the manufacture of the dyestuffs by the aforedescribed processes.

The following examples set forth representative exemplary embodiments of the invention, and these examples are intended to be solely illustrative and not at all limitative. In such examples, the parts are by weight and the temperatures are in degrees centigrade.

*Example 1*

47 parts of the aminoazo dyestuff, obtained by coupling one mole of diazotized 1-(4'-aminobenzoylamino)-2-hydroxy-3-carboxybenzene-5-sulfonic acid with one mole of 3-amino-1-methylbenzene, are dissolved in 2000 parts of water with addition of sodium carbonate until there is a distinct alkaline reaction, and then, at 0–5° and while stirring, fumaric acid dichloride is added until no free amino group can be detected.

The thus-prepared dyestuff is precipitated with the aid of sodium chloride (common salt) at 60–70°, filtered off, and finally dried. Its yellow dyeings on cotton, as such and also following aftercoppering, are of outstanding fastness to light. The dyestuff corresponds to the formula

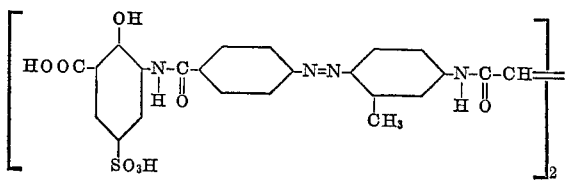

If, instead of the 47 parts of the aminoazo dyestuff from diazotized 1-(4'-aminobenzoylamino)-2-hydroxy-3-carboxybenzene-5-sulfonic acid and 3-amino-1-methylbenzene, 47 parts of the aminoazo dyestuff from one mole of 1-(4'-aminobenzoylamino)-3-carboxy-4-hydroxybenzene-5-sulfonic acid and one mole of 3-amino-1-methylbenzene are reacted with fumaric acid dichloride according to the foregoing prescriptions, there is likewise obtained a yellow cotton dyestuff of excellent properties.

*Example 2*

51.3 parts of the aminoazo dyestuff, obtained by coupling one mole of diazotized 1-(4'aminobenzoylamino)-2-hydroxy-3-carboxybenzene-5-sulfonic acid with 1 mole of 3-amino-1-acetylaminobenzene, are dissolved in 1200 parts of water with addition of sodium bicarbonate until there is a distinct alkaline reaction, and then, at 0–5° and while stirring, fumaric acid dichloride is added until no free amino group can be detected.

The formed dyestuff is precipitated with the aid of common salt at about 70°, filtered off, and finally dried. It dissolves in water with yellow coloration and dyes cotton in pretty yellow shades which, as such as well as when after coppered, are of very good fastness to light. The new dyestuff corresponds to the formula

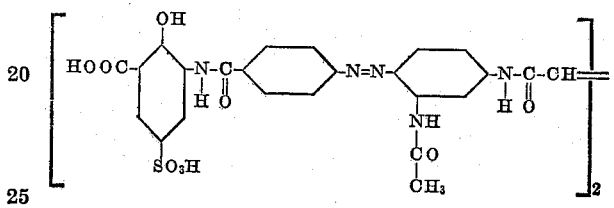

A similar dyestuff is obtained when, in the foregoing, the fumaric acid dichloride is replaced by mesaconic acid dichloride.

If, instead of the aminoazo dyestuff from diazotized 1-(4'-aminobenzoylamino)-2-hydroxy-3-carboxybenzene-5-sulfonic acid and 3-amino-1-acetylaminobenzene, an equivalent quantity of the aminoazo dyestuff prepared by coupling one mole of diazotized 1-(4'-aminobenzoylamino)-3-carboxy-4-hydroxybenzene-5-sulfonic acid with one mole of 3-amino-1-acetylaminobenzene is reacted with fumaric acid dichloride according to the foregoing prescriptions, there is likewise obtained an excellent cotton dyestuff of the formula

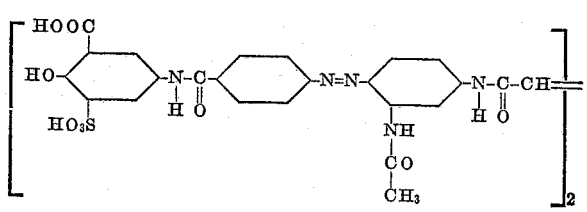

*Example 3*

46.5 parts of the aminoazo dyestuff, obtained by coupling one mole of diazotized 1-(4'-aminobenzoylamino)-2-hydroxy-3-carboxybenzene-5-sulfonic acid with one mole of phenylaminomethane sulfonic acid and splitting off the —CH$_2$—SO$_3$H— group, are dissolved in 1000 parts of water with addition of sodium bicarbonate until the reaction is distinctly alkaline and then, at 0–5° and while stirring, fumaric acid dichloride is added until no free amino group can be detected.

The resultant disazo dyestuff is precipitated at about 70° with the aid of sodium chloride, filtered off, and finally dried. Its dyeings on cotton are pure yellow and, as such or in the form of the aftercoppered dyeings, have very good fastness properties. The dyestuff corresponds to the formula

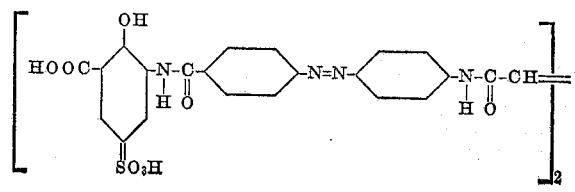

A similar dyestuff is obtained when, in the foregoing, the fumaric acid dichloride is replaced by mesaconic acid dichloride. If, instead of the aminoazo dyestuff from 1 - (4' - aminobenzoylamino) - 2 - hydroxy - 3 - carboxybenzene-5-sulfonic acid used according to the preceding portion of this example, an equivalent quantity of the corresponding aminoazo dyestuff from 1 - (4' - aminobenzoylamino) - 3 - carboxy - 4 - hydroxybenzene - 5 - sulfonic acid is reacted with fumaric acid dichloride, there is likewise obtained a yellow cotton dyestuff with excellent properties.

Example 4

54.3 parts of the aminoazo dyestuff, obtained by coupling one mole of diazotized 1-(4'-aminobenzoylamino)-2 - hydroxy - 3 - carboxybenzene - 5 - sulfonic acid with one mole of 3-amino-1-carbethoxyaminobenzene, are dissolved in 900 parts of water with addition of sodium carbonate until the reaction is distinctly alkaline and then, at 0–5° and while stirring, fumaric acid dichloride is added until no more free amino group can be detected.

The formed disazo dyestuff, isolated in accordance with the procedure set forth in the preceding examples, yields yellow dyeings on vegetable fibers, which dyeings— as such or in the aftercoppered state—are characterized by excellent fastness properties.

The same dyestuff is obtained when use is made, in the preceding, of fumaric acid dibromide instead of fumaric acid dichloride.

It corresponds to the formula

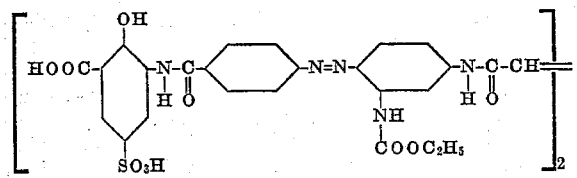

Example 5

35.1 parts of the aminoazo dyestuff, obtained by coupling one mole of diazotized 1-amino-3-carboxy-4-hydroxybenzene-5-sulfonic acid with one mole of 3-amino-1-methylbenzene, are dissolved in 800 parts of water with addition of sodium carbonate until the reaction is distinctly alkaline and then, at 0–5° and while stirring, fumaric acid dichloride is added until no more free amino group can be detected. The reaction is kept alkaline throughout the addition of the fumaric acid dichloride by the dropwise introduction of an aqueous solution of sodium carbonate.

Isolation of the thus-formed disazo dyestuff is effected after the manner described in the preceding examples. It dyes cotton yellow. The resultant dyeings, particularly when aftercoppered, are of very good fastness properties.

A similar dyestuff is obtained when, in the foregoing, the fumaric acid dichloride is replaced by mesaconic acid dichloride.

If, instead of the aminoazo dyestuff prepared from 1 - amino - 3 - carboxy - 4 - hydroxybenzene - 5 - sulfonic acid and 3-amino-1-methylbenzene, an equivalent quantity of the aminoazo dyestuff prepared from 1 mole of diazotized 1 - amino - 3 - carboxy - 4 - hydroxybenzene-5-sulfonic acid and one mole of 1-amino-2-methoxy-5-methylbenzene is reacted with fumaric acid dichloride, there is likewise obtained a valuable dyestuff which dyes cotton reddish-yellow. This dyestuff corresponds to the formula

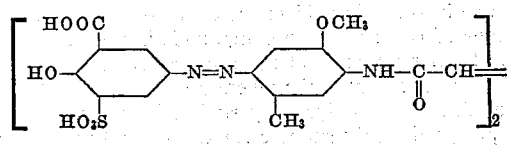

Example 6

48.5 parts of the aminoazo dyestuff, obtained by coupling one mole of diazotized 2-hydroxy-3-carboxy-4'-amino-1,1'-diphenylurea-5-sulfonic acid with one mole of 3-amino-1-methylbenzene are dissolved, together with the quantity of sodium bicarbonate necessary for a weakly alkaline reaction, in 800 parts of water and then, at 0–5° and while stirring, fumaric acid dichloride is added until no more free amino group can be detected, i. e. until no more diazotizable dyestuff is present. The weakly alkaline reaction can be maintained during the addition of the fumaric acid dichloride and until the reaction is terminated, by the intermittent addition of small portions of additional sodium bicarbonate.

The dyestuff, isolated as described in the preceding examples, is a brown powder which dissolves in water with yellow coloration. It possesses a strong affinity for vegetable fiber. Its cotton dyeings, as such or in the aftercoppered state, have excellent fastness properties.

The identical dyestuff is obtained when, in the foregoing, the fumaric acid dichloride is replaced by fumaric acid dibromide.

It possesses the formula

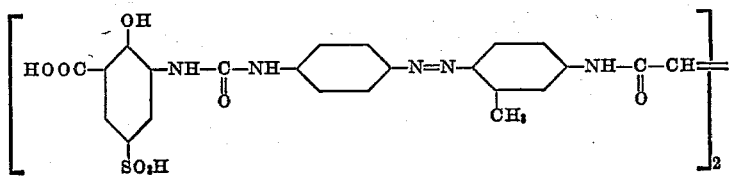

The 2-hydroxy-3-carboxy-4'-amino-1,1'-diphenylurea-5-sulfonic acid, as a starting material, is prepared by condensing an alkali metal salt of the 1-amino-2-hydroxy-3-carboxybenzene-5-sulfonic acid with 4-nitrophenylisocyanate in an aqueous solution and subsequently reducing the nitro group in usual manner, e. g. by treating the condensation product with sodium disulfide.

The following table sets forth examples of additional dyestuffs which can be produced according to the present invention by following the prescriptions of the preceding examples, using equivalent amounts of the corresponding reactants:

| Example No. | Dyestuff Formula | Dyeing on Cotton |
|---|---|---|
| 7 | [structure with HOOC, OH, SO₃H, NH-C(=O)-C₆H₄-N=N-C₆H₄-NH-C(=O)-NH, NH-COCH₂CH₃]₂ | yellow. |
| 8 | [structure with HOOC, OH, SO₃H, NH-C(=O)-C₆H₄-N=N-C₆H₄-NH-C(=O)-CH=, NH-COOCH₂CH₂CH₃]₂ | Do. |
| 9 | [structure with HOOC, OH, SO₃H, NH-C(=O)-C₆H₄-N=N-C₆H₄(OCH₃)-NH-C(=O)-CH=, CH₃]₂ | reddish yellow. |
| 10 | [structure with HOOC, HO, HO₃S, NH-C(=O)-C₆H₄-N=N-C₆H₄(OCH₃)-N(H)-C(=O)-CH=, CH₃]₂ | Do. |
| 11 | [structure with HOOC, OH, SO₃H, NH-C(=O)-C₆H₄-N=N-C₆H₄(OC₂H₅)-N(H)-C(=O)-CH=, CH₃]₂ | Do. |
| 12 | [structure with HOOC, HO, HO₃S, NH-C(=O)-C₆H₄-N=N-C₆H₄(OCH₃)-NH-C(=O)-CH=, H₃C-C(CH₃)-CH₃]₂ | Do. |
| 13 | [structure with HOOC, HO, HO₃S, -N=N-C₆H₄-NH-C(=O)-CH=, NHCOCH₃]₂ | Do. |
| 14 | [structure with HOOC, HO, HO₃S, -N=N-C₆H₄(OCH₃)-N'H-C(=O)-CH=, NHCOCH₃]₂ | orange. |

Example 15

12.9 parts (0.05 mole) of 4-hydroxy-4'-amino-1,1'-azobenzene-3-carboxylic acid are dissolved with 25 parts (0.05 mole) of 4-hydroxy-5-carboxy-2'-methyl-4'-(4''-amino)-benzoylamino-5'-methoxy-1,1'-azobenzene-3-sulfonic acid in 2500 parts of water with the aid of sodium hydroxide until there is a weak alkaline reaction (pH of about 8.0). The solution is cooled to 5° by the addition of ice; thereupon, at the said temperature and while stirring thoroughly, a 20% solution of fumaric acid dichloride is uniformly added within one hour until free NH₂ is no longer detectable. The reaction solution is maintained weakly alkaline (pH of about 8.0) throughout this operation by the dropwise addition of dilute aqueous sodium hydroxide solution. The dyestuff solution is then warmed to 80°, after which the obtained dyestuff mixture is salted out and filtered off. It is a yellow-brown powder, the asymmetrical constituent of which corresponds to the formula

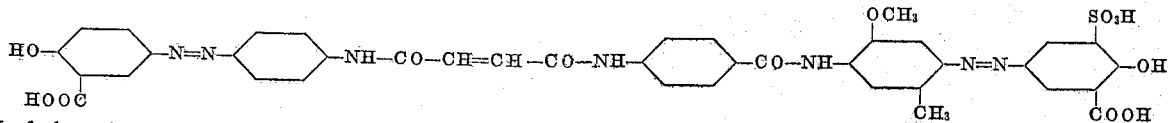

and which dissolves with yellow coloration in water, and dyes cotton and fibers of regenerated cellulose in clear yellow shades. The dyeings, especially when they are treated with copper-yielding agents, possess good fastness to light and to wet treatments.

Similar dyestuffs of the same excellent properties are obtained when, on the one hand, the 4-hydroxy-4'-amino-1,1'-azobenzene-3-carboxylic acid of the present example is replaced by an equivalent quantity of 4-hydroxy-5-methyl - 4' - amino - 1,1' - azobenzene - 3 - carboxylic acid, 4 - hydroxy - 6 - methyl - 4' - amino - 1,1' - azobenzene-3-carboxylic acid, 4-hydroxy-2'-chloro-4'-amino-1,1'-azobenzene-3-carboxylic acid, or 4-hydroxy-4'-amino-1,1'-azobenzene-3,3'-dicarboxylic acid, and/or on the other hand the 4-hydroxy-5-carboxy-2'-methyl-4'-(4''-amino)-benzoylamino - 5' - methoxy - 1,1' - azobenzene - 3 - sulfonic acid is replaced by an equivalent quantity of 4-hydroxy - 5 - carboxy - 2' - methyl - 4' - (3'' - amino)-benzoylamino-5'-methoxy-1,1'-azobenzene-3-sulfonic acid or of one of the aminoazo dyestuffs obtained by coupling diazotized 1-(4'-amino)-benzoylamino-2-hydroxy-3-carboxybenzene-5-sulfonic acid with 1-amino-3-methylbenzene or diazotized 1-(4'-amino)-benzoylamino-3-carboxy-4-hydroxybenzene-5-sulfonic acid with 1-amino-2-methoxy-5-methylbenzene.

*Example 16*

37.5 parts (0.075 mole) of 4-hydroxy-5-carboxy-2'-methyl - 4' - (4'' - amino) - benzoylamino - 5' - methoxy-1,1'-azobenzene-3-sulfonic acid and 62.5 parts (0.125 mole) of 4-hydroxy-5-carboxy-2'-methyl-4'-(3''-amino)-benzoylamino-5'-methoxy-1,1'-azobenzene-3-sulfonic acid are dissolved in 3000 parts of water at a pH of about 7.0 with the aid of dilute aqueous sodium hydroxide solution, and the resultant solution is cooled to about 5° with crushed ice. After the addition of 40 parts of N,N-dimethylaminobenzene, a 20% solution of symmetrical maleic acid dichloride (B. P. 15 mm.: 79°; $d_4^{20}$: 1.432) in 1,2-dichlorobenzene is added dropwise, uniformly and slowly and while stirring thoroughly, until free $NH_2$ is no longer detectable. The dyestuff solution is then adjusted to alkalinity to Brilliant Yellow with the aid of sodium carbonate, the temperature raised to 80 to 90°, the dyestuff salted out of the solution with the aid of sodium chloride, and the precipitate collected on a filter. Dried and ground, the product is a brown powder, the asymmetrical constituent of which corresponds to the formula

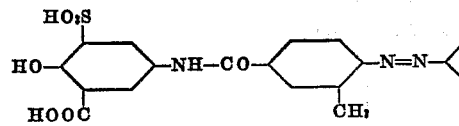 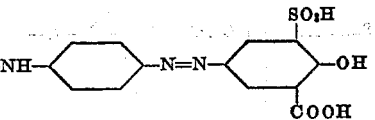

pound, obtained by the acid coupling of diazotized 1-(4'-amino - 3' - methyl) - benzoylamino - 3 - carboxy - 4-hydroxybenzene - 5 - sulfonic acid with 1 - amino - 3 methylbenzene, and 16.9 parts (0.05 mole) of 4-hydroxy-5-carboxy-4'-amino-1,1'-azobenzene-3-sulfonic acid are dissolved in 2200 parts of water with the aid of an excess of lithium carbonate, and then, following the procedure set forth in Example 16, a mixture of 90 parts of fumaric acid dichloride, 10 parts of symmetrical maleic acid dichloride and 400 parts of methylbenzene is added until no free $NH_2$ is detectable. The resultant condensation product—isolated, dried and ground—is a yellow-brown powder, the asymmetrical constituent of which corresponds to the formula and which dissolves with yellow coloration in water and dyes cotton and fibers of regenerated cellulose in clear yellow shades which, particularly after treatment with copper-yielding agents, are characterized by good to very good fastness to light and to wet treatments.

Similar disazo dyestuff mixtures, having similar excellent properties, are obtained when, on the one hand, the diazo component of the first aminomonoazo compound of this example is replaced by 1-(3'- or 4'-amino)- benzoyl - amino - 3 - carboxy - 4 - hydroxybenzene - 5 - sulfonic acid or 1-(4'-amino)-benzoylamino-2-hydroxy-3-carboxybenzene-5-sulfonic acid and/or on the other hand the azo component is replaced by 1-amino-3-acetylaminobenzene or 1-amino-2-methoxy-5-methylbenzene. The first aminomonoazo compound can also be replaced by an aminomonoazo compound obtained by coupling diazotized 1 - amino - 3 - carboxy - 4 - hydroxybenzene - 5-sulfonic acid with 1-amino-3-methylbenzene or 1-amino-2-methoxy-5-methylbenzene or 1-amino-3-acetylaminobenzene, followed by reaction of the resultant aminomonoazo compound with 4-nitrobenzene-1-carboxylic acid chloride or 3-nitro-4-methoxybenzene-1-carboxylic acid chloride and reduction of the nitro group to the amino group.

Similar dyestuffs are also obtained when, in the foregoing, the 4-hydroxy-5-carboxy-4'-amino-1,1'-azobenzene-3-sulfonic acid is replaced by an equivalent amount of 4 - hydroxy - 5 - carboxy - 2' - butyrylamino - 4' - amino-1,1'-azobenzene-3-sulfonic acid or of 4-hydroxy-5-carboxy - 2' - methyl - 4' - amino - 5' - propoxy - 1,1' - azobenzene-3-sulfonic acid or of 3-acetylamino-4-hydroxy-

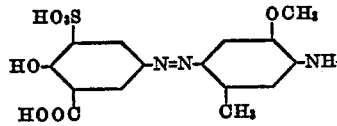 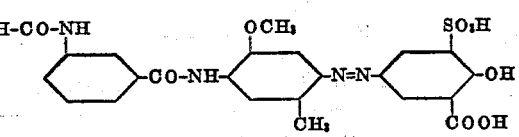

and which dissolves with yellow coloration in water. Its clear yellow dyeings on cotton or fibers of regenerated cellulose are characterized by good fastness to light and to wet treatments, particularly when they are treated with copper-yielding agents.

Very similar dyestuffs, which also have very good fastness properties, are obtained when, instead of symmetrical maleic acid dichloride, use is made of an equivalent amount of the dichloride or dibromide of methylfumaric acid or of chlorofumaric acid or of bromofumaric acid, or of a mixture of two or more of these dicarboxylic acid dichlorides or dibromides.

*Example 17*

72.6 parts (0.15 mole) of the aminomonoazo com- 5-carboxy-4'-amino-1,1'-azobenzene-2'-sulfonic acid or of 3 - formylamino - 4 - hydroxy - 5 - carboxy - 4' - amino-1,1'-azobenzene-2'-sulfonic acid or of 3-nitro-4-hydroxy-5 - carboxy - 4' - amino - 1,1' - azobenzene - 2' - sulfonic acid or of 3-carbomethoxy- or -carboethoxy-amino-4-hydroxy - 5 - carboxy - 4' - amino - 1,1' - azobenzene - 2'-sulfonic acid.

*Example 18*

27 parts of 4-amino-4'-(3''-carboxy-4''-hydroxybenzeneazo)-stilbene-2,2'-disulfonic acid are dissolved as the trisodium salt in 500 parts of water with the aid of an excess of sodium carbonate. The solution is cooled to 50–10° by the addition of ice and then, while stirring thoroughly, a benzene solution of fumaric acid dichloride is added, in the course of 1 to 2 hours, until free amino can no longer be detected in the reaction solution. The formed disazo dyestuff is precipitated from the reaction solution at 80° by the addition of a small quantity of sodium chloride, after which the precipitate is filtered off and dried. The product thus obtained corresponds to the formula

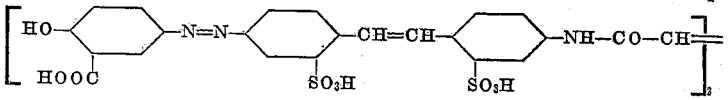

and possesses good affinity for cotton and for fibers of regenerated cellulose; its dyeings, treated with copper-yielding agents, are brown-orange and possess good fastness properties.

*Example 19*

30.4 parts of fumaric acid di-[3'-sulfo-4'-amino-1,1'-diphenyl-(4)]-amide are dissolved in 400 parts of water in the form of the disodium salt. 6.9 parts of sodium nitrite are added to the resultant solution, and then sufficient ice to bring the temperature of the mass down to 5°. At this temperature and in the course of 20 to 30 minutes, 80 parts of 15% hydrochloric acid are added dropwise. The resultant acid tetrazo suspension is stirred for about 3 hours at 5° and then, after decomposing excess nitrous acid by means of urea or aminosulfonic acid, it is slowly added to an ice-cold solution, containing an excess of sodium carbonate, of 25 parts of 1-acetoacetylamino-4-hydrozybenzene-3-carboxylic acid and 500 parts of water. Upon completion of the coupling, the mass is heated to 70–80°, and the resultant disazo dyestuff isolated. Dried and ground, it is an olive-brown powder, which corresponds to the formula

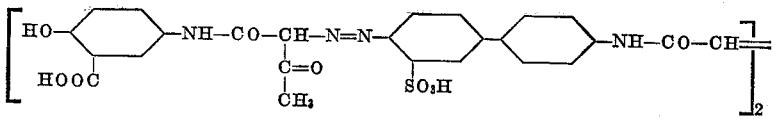

and which dissolves with yellow coloration in water. Its dyeings on cotton and fibers of regenerated cellulose are, after treatment with copper-yielding agents, yellow and are characterized by good fastness properties.

If, in the preceding paragraph, the 30.4 parts of fumaric acid di-[3'-sulfo-4'-amino-1,1'-diphenyl-(4)]-amide are replaced by 22.8 parts of fumaric acid di-(3'-sulfo-4'-aminophenyl)-amide and/or the 24 parts of 1-acetoacetylamino-4-hydroxybenzene-3-carboxylic acid are replaced by 24 parts of 1-(3'-carboxy-4'-hydroxy)-phenyl-3-methyl-5-pyrazolone, a disazo dyestuff having similar good properties is likewise obtained, the coppered dyeings being somewhat more reddish yellow than those of the disazo dyestuff obtained according to the preceding paragraph.

If, instead of 24 parts of 1-acetoacetylamino-4-hydroxybenzene-3-carboxylic acid, 14 parts of 1-hydroxybenzene-2-carboxylic acid or 17.5 parts of 1-hydroxy-6-chlorobenzene-2-carboxylic acid or 22 parts of 1-hydroxy-6-bromobenzene-2-carboxylic acid are employed, and the coupling carried out in weak caustic alkaline medium, valuable dyestuffs are also obtained, the yellow coppered dyeings on cotton or fibers of regenerated cellulose possess good fastness properties.

*Example 20*

58.2 parts of 4-hydroxy-2'-chloro-4'-amino-1,1'-azobenzene-3-carboxylic acid are dissolved in 3000 parts of water with the aid of dilute aqueous sodium hydroxide solution and are condensed as described in Example 1 with fumaric acid dichloride. During the condensation the pH value is held at approximately 7–8 by adding small amounts of lithium carbonate. The resulting dyestuff is precipitated, filtered, washed and dried. It is a brown powder which corresponds to the formula

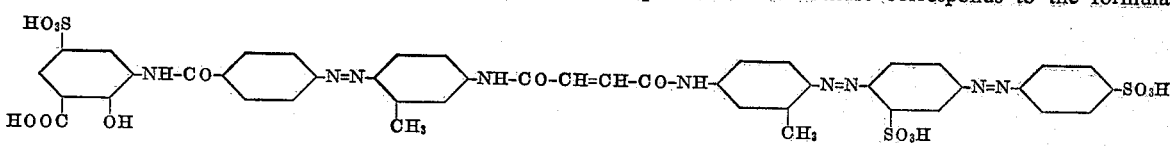

and dissolves with orange-yellow coloration in water and with red coloration in concentrated sulfuric acid. Its coppered reddish yellow dyeings on cotton or fibers of regenerated cellulose are characterized by excellent fastness to light and to wet treatments.

A similar disazo dyestuff is obtained when, instead of the 58.2 parts of the aminomonoazo compound of the example, use is made of 60.2 parts of 4-hydroxy-4'-amino-1,1'-azobenzene-3,3'-dicarboxylic acid.

*Example 21*

23.5 parts (0.05 mole) of the aminomonoazo compound, prepared by the acid coupling of diazotized 1-(4'-amino)-benzoylamino-2-hydroxy-3-carboxybenzene-5-sulfonic acid with 1-amino-3-methylbenzene, and 23.8 parts (0.05 mole) of the aminodisazo compound prepared by the acid coupling of diazotized 4'-amino-1,1'-azobenzene-4,3'-disulfonic acid with 1-amino-3-methylbenzene are together dissolved in water with the addition of aqueous sodium hydroxide solution, and then treated at 5–10° and while stirring with fumaric acid dichloride until free amino is no longer detectable. During this procedure, the reaction solution is kept constantly weakly alkaline by running in a 10% aqueous sodium carbonate solution. The thus-produced dyestuff mixture is separated out with the aid of sodium chloride at 70–80°, after which it is filtered off and then dried under reduced pressure. It dissolves in water with golden yellow coloration and dyes cotton and fibers of regenerated cellulose in light-fast beautiful yellow-orange shades. The fastness of the dyeings to wet treatments is enhanced by after-treatment with copper-yielding agents. The asymmetrical component of the mixture corresponds to the formula Dyestuffs with similar properties are obtained when, in the first aforementioned aminomonoazo compound, the 1-(4'-amino)-benzoylamino-2-hydroxy-3-carboxybenzene-5-sulfonic acid is replaced by 1-(4'-amino)-benzoylamino-3-carboxy-4-hydroxybenzene-5-sulfonic acid and/or the 1-amino-3-methylbenzene is replaced by another amine of the benzene series which is capable of coupling, such for example as 1-amino-2,5-dimethylbenzene, 1-amino-2-methoxy-5-methylbenzene, 1-amino-3-acetylaminobenzene, 1-amino-3-benzoyl-aminobenzene, 1-amino-2,5-dimethoxybenzene, 1-amino-2-methoxy-5-acetylaminobenzene, etc. Somewhat more reddish dyestuffs with similar good properties are obtained when, in the first paragraph of the present example, the aminodisazo compound of the initial mixture is replaced by an aminodisazo compound obtained by coupling a diazotized 2-aminonaphthalene-4,8- or -5,7- or -6,8-disulfonic acid with one of the afore-enumerated amines of the benzene series, diazotizing the resultant aminomonoazo compound, and again coupling with one of the said amines of the benzene series.

*Example 22*

37.3 parts (0.05 mole) of the aminodisazo compound, prepared by coupling 1 mole of tetrazotized 1-amino-4-(4'-amino)-benzoylamino-benzene first with 1 mole of 1-hydroxybenzene-2-carboxylic acid and then with 1 mole of 2 - (4' - amino) - benzoylamino - 5 - hydroxynaphthalene-7-sulfonic acid, and 12.9 parts (0.05 mole) of 4-hydroxy-4'-amino-1,1'-azobenzene-3-carboxylic acid are together dissolved neutral in water with the addition of aqueous sodium hydroxide solution. Into the resultant solution, there are simultaneously added dropwise and with good stirring a mixture of 7.7 parts (0.05 mole) of fumaric acid dichloride and 8 parts of benzene, as well as such quantity of an aqueous sodium carbonate solution as is necessary to keep the reaction of the condensation mass weakly alkaline throughout. After all the fumaric acid dichloride has been added, the mixture is further stirred until free amino is no longer detectable therein. Thereupon the produced dyestuff mixture is precipitated from the warm mixture with the aid of sodium chloride, and the precipitate then filtered off and dried. It is a dark red powder, which dyes cotton and fibers of regenerated cellulose in yellowish red shades of good dischargeability and fastness to light, the fastness of the dyeings to wet treatments being improved by aftertreatment with copper-yielding agents. The asymmetrical component of the product corresponds to the formula

*Example 23*

By replacing the 0.05 mole of the first aminomonoazo compound in Example 15 by 0.05 mole of 4-hydroxy-5-carboxy - 2' - methyl - 4' - (3'' - chloro - 4'' - amino) - benzoylamino-5'-methoxy-1,1'-azobenzene-3-sulfonic acid or of 4-hydroxy-5-carboxy-2'-methyl-4'-(3''-amino)-benzoylamino-5'-methoxy-1,1'-azobenzene-3-sulfonic acid or of 4-hydroxy-5-carboxy-4'-(3''-methyl- or -ethyl-4''-amino)-benzoylamino-1,1'-azo-benzene-3-sulfonic acid or of 4-hydroxy-5-carboxy-4'-(3''-amino-4''-methoxy- or -ethoxy)-benzoylamino-1,1'-azobenzene-3-sulfonic acid or of 4-hydroxy-5-carboxy-2'-acetylamino - 4' - (4''-amino)-benzoylamino-1,1'-azobenzene-3-sulfonic acid or of 4-hydroxy - 5 - carboxy-2'-(2''-carboxy)-benzoylamino-4'-(4''-amino) - benzoylamino - 1,1' - azobenzene - 3 - sulfonic acid, and/or by replacing the 0.05 mole of 4-hydroxy-5-carboxy - 2' - methyl - 4' - (4'' - amino) - benzoylamino - 5'-methoxy-1,1'-azobenzene-3-sulfonic acid by 0.05 mole of a monoazo compound obtained by the acid coupling of diazotized 1-(3'- or 4'-amino)-benzoylamino-2-hydroxy-3-carboxybenzene-5-sulfonic acid or 1-(3'- or -4'-amino)-benzoylamino - 3 - carboxy -4 - hydroxybenzene - 5 - sulfonic acid or 1-(3'-amino-4'-chloro or -bromo)-benzoyl-amino-3-carboxy-4-hydroxybenzene-5-sulfonic acid with 1-amino-3-methylbenzene or 1-amino-2-methoxy-5-methylbenzene or 1-amino-3-acetylaminobenzene, and otherwise proceeding after the manner described in Example 15, there are likewise obtained dyestuff mixtures, the coppered dyeings of which have good fastness to light and to wet treatments.

The following table sets forth further valuable dyestuffs which may be prepared according to one of the procedures set forth in Examples 1–18, 21 and 22. For example, one mole of aminoazo compound AA and one mole of

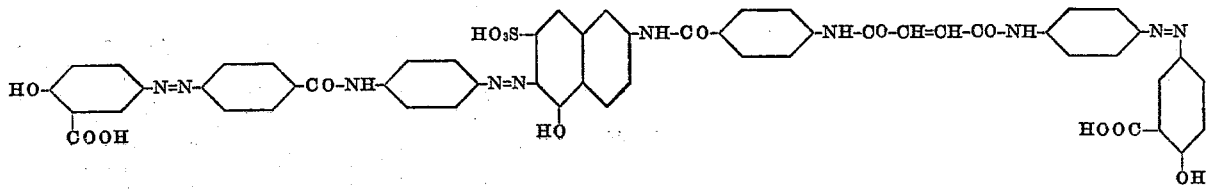

Dyestuffs with similar properties are obtained when, on the one hand the 1-hydroxybenzene-2-carboxylic acid used in preparing the first-mentioned aminodisazo compound is replaced by 1-hydroxy-6-methylbenzene-2-carboxylic acid and/or the 2-(4'-amino)-benzoylamino-5-hydroxynaphthalene-7-sulfonic acid is replaced by 2-(3'-amino) - benzoylamino - 5 - hydroxy - naphthalene - 7 - sulfonic acid or 2-(3'-amino-4'-methyl)-benzoylamino-5-hydroxynaphthalene-7-sulfonic acid or 2-(4'-amino)-benzoylamino-6-hydroxynaphthalene-8-sulfonic acid or 2-amino-5-hydroxynaphthalene-7-sulfonic acid and/or, on the other hand, the 4-hydroxy-4'-amino-1,1'-azobenzene-3-carboxylic acid is replaced by an equivalent quantity of 4 - hydroxy - 5 - methyl - 4' - amino - 1,1' - azobenzene - 3-carboxylic acid or 3-carboxy-4-hydroxy-4'-amino-1,1'-azobenzene-5-sulfonic acid or 4'-(4''-amino)-benzoyl-amino - 3 - carboxy - 4 - hydroxy - 1,1' - azobenzene - 5 - sulfonic acid or one of the aminoazo compounds obtained by coupling diazotized 1-(4'-amino)-benzoylamino-3-carboxy-4-hydroxybenzene-5-sulfonic acid with 1-amino-2-methoxy-5-methylbenzene or by coupling diazotized 1-(4'-amino) - benzoylamino - 2 - hydroxy - 3 - carboxybenzene-5-sulfonic acid with 1-amino-3-methylbenzene.

aminoazo compound AB can be bound together with one mole of fumaric acid dihalide. However, the aminoazo compounds AA and AB can also be used in other proportions, as for example in the proportions of 0.3 or 0.5 or 0.7 or 0.9 or 1.2 or 1.4 or 1.6 or 1.8 moles to 1.7 or 1.5 or 1.3 or 1.1 or 0.8 or 0.6 or 0.4 or 0.2 mole, respectively, with the provision that in any event two moles of aminoazo compound are reacted with one mole of fumaric acid dihalide.

Instead of a fumaric acid dihalide, use may be made of symmetrical maleic acid dichloride, a chlorofumaric acid dihalide, a bromofumaric acid dihalide or a methylfumaric acid dihalide. The properties of the thus-obtained dyestuffs are similar to those obtained with fumaric acid dihalide; the shades vary only very slightly from those of the fumaric acid products.

Also suitable as acid-binding agent, for binding the hydrogen halide evolved during the condensation, are for example the hydroxide or carbonate or acetate of lithium, sodium or potassium, calcium oxide or calcium carbonate, magnesium oxide, N,N-dimethylaminobenzene, etc,

| (1) Example No. | (2) Condensation of Fumaric Acid Dihalide with— | | Shade on Cotton | |
| --- | --- | --- | --- | --- |
| | Aminoazo Compound AA | Aminoazo Compound AB | (3) Direct Dyeing | (4) Coppered Dyeing |
| 24 | 1-amino-4-(4'-nitro)-benzoyl-amino-benzene-2-sulfonic acid ⟶ 1-hydroxy-benzene-2-carboxylic acid and reduction ⟶ 1-amino-3-methylbenzene. | 1-amino-3-carboxy-4-hydroxy-benzene-5-sulfonic acid ⟶ 1-amino-3-acetyl-aminobenzene. | red-orange | red-orange. |
| 25 | 1-amino-3-carboxy-4-hydroxy-benzene-5-sulfonic acid ⟶ 1-(4'-amino)-phenyl-3-methyl-5-pyrazolone. | same as AA | yellow | yellow. |
| 26 | 1-amino-3-carboxy-4-hydroxy-benzene-5-sulfonic acid ⟶ 1-amino-4-acetoacetylamino-benzene. | same as AA | do | Do. |
| 27 | do | 1-amino-3-carboxy-4-hydroxy-benzene-5-sulfonic acid ⟶ 1-(3'-amino)-phenyl-3-methyl-5-pyrazolone. | do | Do. |
| 28 | 1-amino-3-carboxy-4-hydroxy-benzene-5-sulfonic acid ⟶ 1-(4'-amino)-phenyl-3-methyl-5-pyrazolone ⟶ 1-amino-3-methylbenzene. | same as AA | yellow-orange | yellow-orange. |
| 29 | do | 1-amino-3-carboxy-4-hydroxy-benzene-5-sulfonic acid ⟶ 1-amino-4-acetoacetylamino-benzene ⟶ 1-amino-3-methyl-benzene. | do | Do. |
| 30 | 1-amino-3-carboxy-4-hydroxy-benzene-5-sulfonic acid ⟶ 1-amino-4-acetoacetylamino-benzene ⟶ 1-amino-3-methyl-benzene. | do | do | Do. |
| 31 | 1-amino-3-carboxy-4-hydroxy-benzene-5-sulfonic acid ⟶ 1-aminonaphthalene-6-sulfonic acid ⟶ 1-amino-3-methyl-benzene. | same as AA | brown | brown. |
| 32 | 3-carboxy-4-hydroxy-4'-amino-1,1'-azo-benzene-5-sulfonic acid. | same as AA | yellow | yellow. |
| 33 | 3-carboxy-4-hydroxy-4'-amino-1,1'-azo-benzene-5-sulfonic acid ⟶ 1-(4'-amino)-phenyl-3-methyl-5-pyrazolone. | same as AA | do | Do. |
| 34 | do | 3-carboxy-4-hydroxy-4'-amino-1,1'-azo-benzene-5-sulfonic acid. | do | Do. |
| 35 | 1-amino-2-hydroxy-5-nitro-benzene-3-carboxylic acid ⟶ 1-(4'-amino)-phenyl-3-methyl-5-pyrazolone ⟶ 1-amino-3-benzoylaminobenzene. | same as AA | do | Do. |
| 36 | 4-hydroxy-4'-amino-1,1'-azo-benzene-3-carboxylic acid. | 2-aminonaphthalene-6,8-disulfonic acid ⟶ 1-amino-3-ethylbenzene. | do | Do. |
| 37 | do | 3-aminopyrene-disulfonic acid ⟶ 1-amino-2,5-dimethylbenzene. | reddish yellow | reddish yellow. |
| 38 | do | 1-aminobenzene-4-sulfonic acid ⟶ 1-amino-2-methoxy-5-methyl-benzene. | yellow | yellow. |
| 39 | do | 1-amino-3-carboxy-4-hydroxy-benzene-5-sulfonic acid ⟶ 1-amino-3-propionyl-aminobenzene. | do | Do. |
| 40 | 1-(4'-amino)-benzoylamino-2-hydroxy-3-carboxybenzene-5-sulfonic acid ⟶ 1-amino-3-methylbenzene. | do | do | Do. |
| 41 | do | 2-aminonaphthalene-4,8-disulfonic acid ⟶ 1-amino-2-methoxy-5-methylbenzene. | do | Do. |
| 42 | 1-amino-3-carboxy-4-hydroxy-benzene-5-sulfonic acid ⟶ 1-amino-3-acetyl-aminobenzene. | 3-carboxy-4-hydroxy-4'-amino-1,1'-azo-benzene-2'-sulfonic acid ⟶ 1-amino-3-methyl-benzene. | reddish yellow | orange. |
| 43 | do | 1-(4'-amino)-benzoylamino-2-hydroxy-3-carboxybenzene-5-sulfonic acid ⟶ 1-amino-3-methylbenzene ⟶ 1-amino-3-methylbenzene. | yellow | reddish yellow. |
| 44 | do | 3-carboxy-4-hydroxy-2'-methyl-4'-(4''-amino)-benzoylamino-5'-methoxy-1,1'-azobenzene-5-sulfonic acid ⟶ 1-amino-3-methylbenzene. | do | Do. |
| 45 | do | 3-aminopyrene-disulfonic acid ⟶ 1-amino-2-methoxy-5-methyl-benzene. | orange | orange. |

*Example 46*

55 parts of symmetrical fumaric acid di-[5-hydroxy-7-sulfonaphthyl-(2)]-amide are dissolved as the disodium salt in 800 parts of warm water. 60 parts of crystalline sodium acetate are added to the solution, which is then cooled to 0–5°. Thereupon, while stirring thoroughly, an ice-cold diazo suspension, prepared by the indirect diazotization of 72 parts of 1-(4'-amino)-benzoylamino-2-hydroxy-3-carboxybenzene-5-sulfonic acid, is run in. The suspension, having a weakly acid reaction, is then neutralized by the addition of aqueous sodium bicarbonate solution in the course of 4 to 5 hours until an alkaline reaction to brilliant yellow is obtained. Upon completion of the coupling, the resultant solution is heated to about 90°, and the produced disazo dyestuff salted out therefrom, filtered off, and dried. It corresponds to the formula

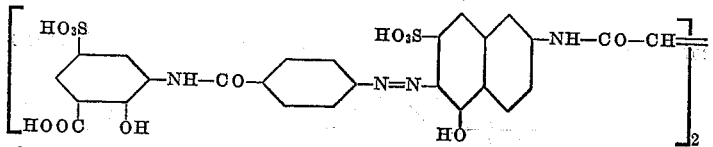

and is a dark powder which dissolves with red coloration in water, and dyes cotton and fibers of regenerated cellulose in red shades. The dyeings have good fastness properties; the latter can be somewhat improved by treatment with copper-yielding agents.

To prepare the symmetrical fumaric acid di-[5-hydroxy-7-sulfonaphthyl-(2)]-amide, 239 parts of 2-amino-5-hydroxynaphthalene-7-sulfonic acid and 40 parts of crystalline sodium acetate are dissolved in 2000 parts of water. Then, in the course of 3 to 4 hours and while stirring thoroughly, a 40% solution of fumaric acid dichloride in benzene is added dropwise until no more free amino is detectable. The condensation mass is then warmed to 70–80°, and the reaction product isolated and dried.

*Example 47*

Dyeing with a representative dyestuff according to the present invention—for example any one of the dyestuffs of the preceding examples—may be carried out as follows:

100 parts of cotton are entered at 30° into a bath containing one part of the dyestuff and one part of Glauber's salt in 300 parts of water. The temperature is raised to the boil within half an hour, then 20 parts of Glauber's salt are added and the bath is allowed to cool to 50°. The dyed material is withdrawn and thoroughly rinsed with water.

For aftercoppering, the dyed material is immersed for half an hour in a bath containing 2 parts of copper sulfate and 2 parts of glacial acetic acid in 3000 parts of water at 70°, then withdrawn, thoroughly rinsed with water, squeezed and dried.

Having thus disclosed the invention, what is claimed is:

1. An azo dyestuff corresponding to the formula

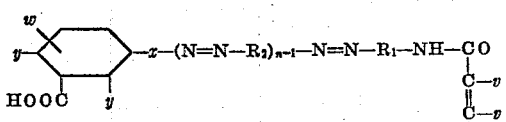
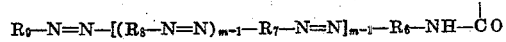

wherein each of $R_1$, $R_2$, $R_6$ and $R_7$ stands for a member selected from the group consisting of benzene, diphenyl, stilbene, naphthalene, 5-pyrazolone and acetoacetylaminophenyl radicals, $R_8$ stands for a member selected from the group consisting of benzene and naphthalene radicals, and $R_9$ stands for a member selected from the group consisting of benzene, naphthalene and pyrene-sulfonic acid radicals; $x$ stands for a member selected from the group consisting of a simple linkage and one of the groups having the formulae

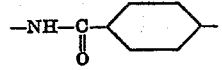

and

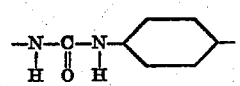

one $y$ stands for —OH and the other $y$ stands for hydrogen; $w$ stands for a member selected from the group consisting of hydrogen, chlorine, bromine, lower alkyl, nitro, acylamino and —SO$_3$H; one $v$ stands for hydrogen and the other $v$ stands for a member selected from the group consisting of hydrogen, chlorine, bromine and methyl; $n$ is one of the integers 1 and 2 when $x$ denotes a simple linkage, and is 1 when $x$ denotes one of the groups having the formulae

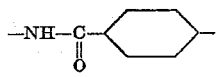

and

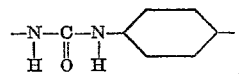

and each $m$ is one of the integers 1 and 2.

2. An azo dye which corresponds to the formula

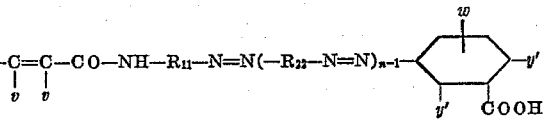
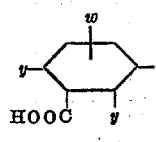

wherein each of $R_1$, $R_{11}$, $R_2$ and $R_{22}$ stands for a radical selected from the group consisting of benzene, diphenyl, stilbene, naphthalene, 5-pyrazolone and acetoacetylaminophenyl radicals, one $y$ and one $y'$ each stands for —OH, the other $y$ and the other $y'$ being hydrogen, each $w$ stands for a member selected from the group consisting of hydrogen, chlorine, bromine, lower alkyl, nitro, acylamino and —SO$_3$H, one $v$ stands for a member selected from the group consisting of hydrogen, chlorine, bromine and methyl, the other $v$ being hydrogen, and each $n$ is one of the integers 1 and 2.

3. An azo dye which corresponds to the formula

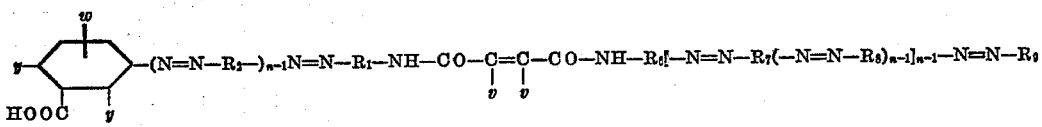

wherein each of $R_1$ and $R_2$ stands for a member selected from the group consisting of benzene, diphenyl, stilbene, naphthalene, 5-pyrazolone and acetoacetylaminophenyl radicals, each of $R_6$, $R_7$ and $R_8$ stands for a member selected from the group consisting of phenyl and naphthyl radicals, $R_9$ stands for a member selected from the group consisting of phenyl, naphthyl and pyrene-sulfonic acid radicals, one $y$ stands for —OH, the other $y$ being hydrogen, $w$ stands for a member selected from the group consisting of hydrogen, chlorine, bromine, lower alkyl, nitro, acylamino and —SO$_3$H, one $v$ stands for a member selected from the group consisting of hydrogen, chlorine, bromine and methyl, the other $v$ being hydrogen, and each $n$ is one of the integers 1 and 2.

4. An azo dyestuff according to claim 1 wherein each $v$ stands for hydrogen.

5. An azo dyestuff according to claim 2 wherein each $v$ stands for hydrogen.

6. An azo dyestuff according to claim 3 wherein each $v$ stands for hydrogen.

7. The polyazo dyestuff corresponding to the formula

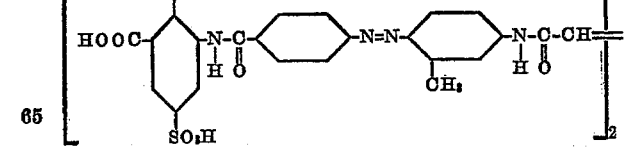

8. The polyazo dyestuff corresponding to the formula

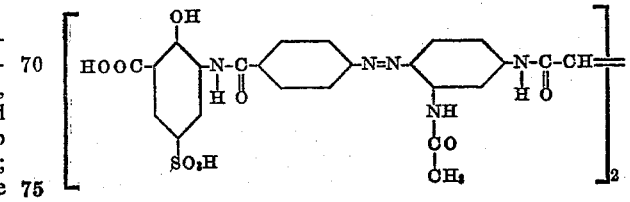

9. The polyazo dyestuff corresponding to the formula

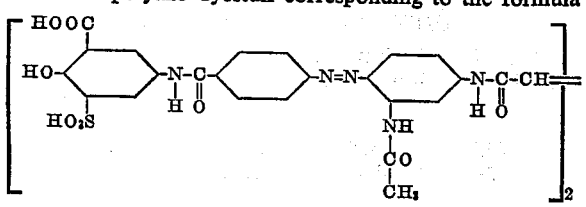

10. The polyazo dyestuff corresponding to the formula

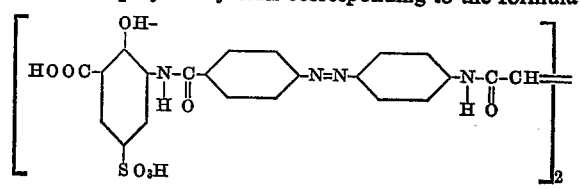

11. The polyazo dyestuff corresponding to the formula

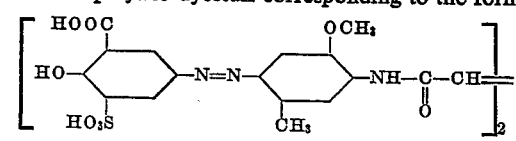

12. A process for the manufacture of an azo dye, which comprises the step of treating, in an aqueous medium and in the presence of an acid-binding agent, two moles of an aminoazo compound selected from the group consisting of two moles of an aminoazo compound which corresponds to the formula

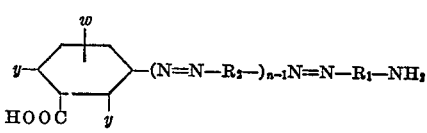

two moles of a mixture of two different aminoazo compounds but which correspond to the same type formula

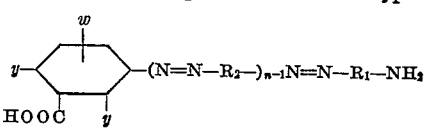

and two moles of a mixture of an aminoazo compound which corresponds to the formula

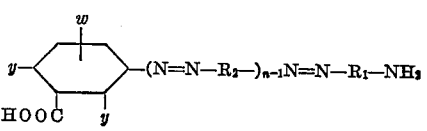

and an aminoazo compound which corresponds to the formula $H_2N-R_6[-N=N-R_7(-N=N-R_8)_{n-1}]_{n-1}-N=N-R_9$ wherein each of $R_1$ and $R_2$ stands for a radical selected from the group consisting of benzene, diphenyl, stilbene, naphthalene, 5-pyrazolone and acetoacetylaminophenyl radicals, each of $R_6$, $R_7$ and $R_8$ stands for a member selected from the group consisting of phenyl and naphthyl radicals, $R_9$ stands for a member selected from the group consisting of phenyl, naphthyl and pyrene-sulfonic acid radicals, one $y$ stands for —OH, the other $y$ being hydrogen, $w$ stands for a member selected from the group consisting of hydrogen, chlorine, bromine, lower alkyl, nitro, acylamino and —$SO_3H$, and each $n$ is one of the integers 1 and 2, with one mole of a dicarboxylic acid halide which corresponds to the formula

wherein A stands for a member selected from the group consisting of hydrogen, chlorine, bromine and methyl, and $z$ stands for a member selected from the group consisting of chlorine and bromine.

13. Process according to claim 12 wherein the dicarboxylic acid halide is a fumaric acid halide.

14. A process for the manufacture of an azo dyestuff, which comprises the step of treating, in an aqueous medium and in the presence of an acid-binding agent, the aminoazo dyestuff of the formula

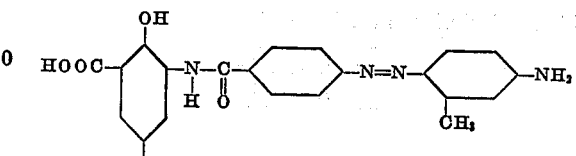

with the dichloride of the formula

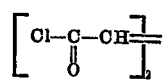

15. A process for the manufacture of an azo dyestuff, which comprises the step of treating, in an aqueous medium and in the presence of an acid-binding agent, the aminoazo dyestuff of the formula

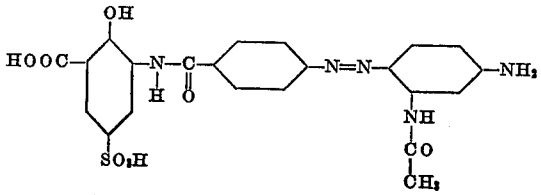

with the dichloride of the formula

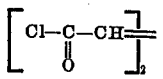

16. A process for the manufacture of an azo dyestuff which comprises the step of treating, in an aqueous medium and in the presence of an acid-binding agent, the aminoazo dyestuff of the formula

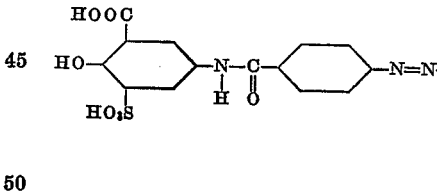

with the dichloride of the formula

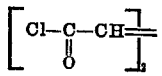

17. A process for the manufacture of an azo dyestuff, which comprises the step of treating, in an aqueous medium and in the presence of an acid-binding agent, the aminoazo dyestuff of the formula

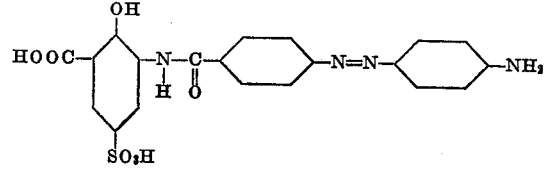

with the dichloride of the formula

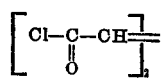

18. A process for the manufacture of an azo dyestuff, which comprises the step of treating, in an aqueous medium and in the presence of an acid-binding agent, the aminoazo dyestuff of the formula
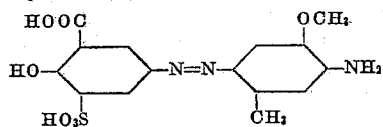
with the dichloride of the formula
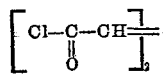
References Cited in the file of this patent
UNITED STATES PATENTS
| 2,104,595 | Schirm | Jan. 4, 1938 |
| 2,646,338 | Kappeler | July 21, 1953 |
FOREIGN PATENTS
| 229,425 | Switzerland | Jan. 17, 1944 |
| 504,489 | Belgium | July 31, 1951 |